June 11, 1940. W. R. MARTIN Re. 21,482
MULTIPLE DRILLING GAUGE
Original Filed June 22, 1934 3 Sheets-Sheet 1
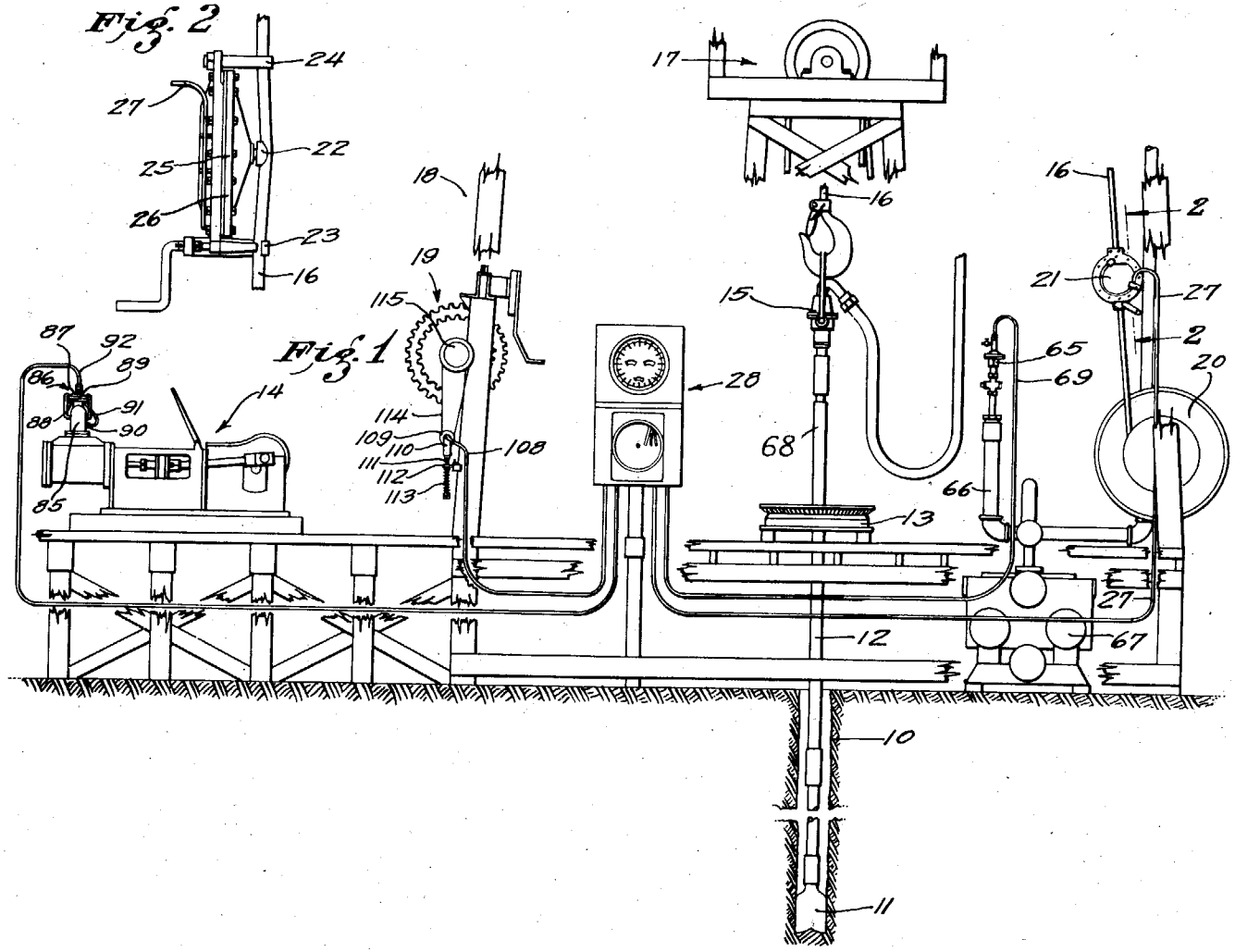
INVENTOR
WALTER R. MARTIN
BY James M. Abbett
ATTORNEY June 11, 1940. W. R. MARTIN Re. 21,482

MULTIPLE DRILLING GAUGE

Original Filed June 22, 1934 3 Sheets-Sheet 2

INVENTOR
WALTER R. MARTIN
BY James M. Abbett
ATTORNEY

June 11, 1940. W. R. MARTIN Re. 21,482

MULTIPLE DRILLING GAUGE

Original Filed June 22, 1934 3 Sheets-Sheet 3

INVENTOR
WALTER R. MARTIN
BY James M. Abbott
ATTORNEY

Reissued June 11, 1940

Re. 21,482

UNITED STATES PATENT OFFICE 21,482

MULTIPLE DRILLING GAUGE

Walter R. Martin, Long Beach, Calif.

Original No. 2,128,833, dated August 30, 1938, Serial No. 731,850, June 22, 1934. Application for reissue April 27, 1939, Serial No. 270,460

5 Claims. (Cl. 73—109)

This invention relates to indicating devices, and particularly pertains to indicating means for use in well drilling operations.

In drilling wells, and particularly in drilling oil wells which it is now customary to drill to depths of some five to ten thousand feet, it is essential for efficient drilling operations and in compliance with property laws that the well shaft shall be drilled straight and that it shall not be permitted to drift. In the case of drilling a crooked hole it will be evident that great strain will be placed on the drill string and the drilling equipment, and that in addition, the lower end of the hole might penetrate earth formation beyond the boundary of the oil property on which the shaft is started. In the early development of oil well drilling the feed of the drill string and the drill tool and other acts concerned with the drilling operation were made by hand adjustment and merely as guided by the experience and judgment of the operator. In these operations it was the desire to maintain an appropriate pressure of the drill tool upon the formation being penetrated at all times. As drilling operations became more complicated due to the increasing depth of well shafts being drilled it became more difficult for the driller to judge the manner in which the drilling operation should be carried out, and various gauges were put into use in an attempt to measure certain controlling conditions and factors involved in the drilling operation. The more important of these measuring devices were a weight indicator, mud pressure indicating means, a torque indicator and a revolution counter, since by the coordinate action of these elements it was possible for the driller to be apprised of the exact performance of the drilling equipment and to regulate the same in direct reference to the formation being penetrated. It is the principal object of the present invention, therefore, to provide gauge mechanism by which these various readings may be obtained in a correlated unit disposed at a convenient point of observation by the driller, and continuously indicating and providing factors of adjustment for drilling operations.

The present invention contemplates the provision of means indicating the general proportion of weight of drill string suspended from the drilling cable, an accurate vernier gauge in connection therewith adapted to be optionally used, a torque indicator by which the degree of torque imposed upon the rotary table and the formation penetrated is indicated, a mud pressure indicator by which the circulating fluid within the drill stem and the hole may be constantly ascertained, and a revolution counter by which the performance of the drill rig may be indicated.

The invention is illustrated by way of example in the accompanying drawings, in which:

Figure 1 is a view in diagram showing the general application of the invention to the various vital elements of an oil well drilling rig.

Fig. 2 is an enlarged view in elevation showing the side view of the weight indicator applied to the cable.

Figure 3:
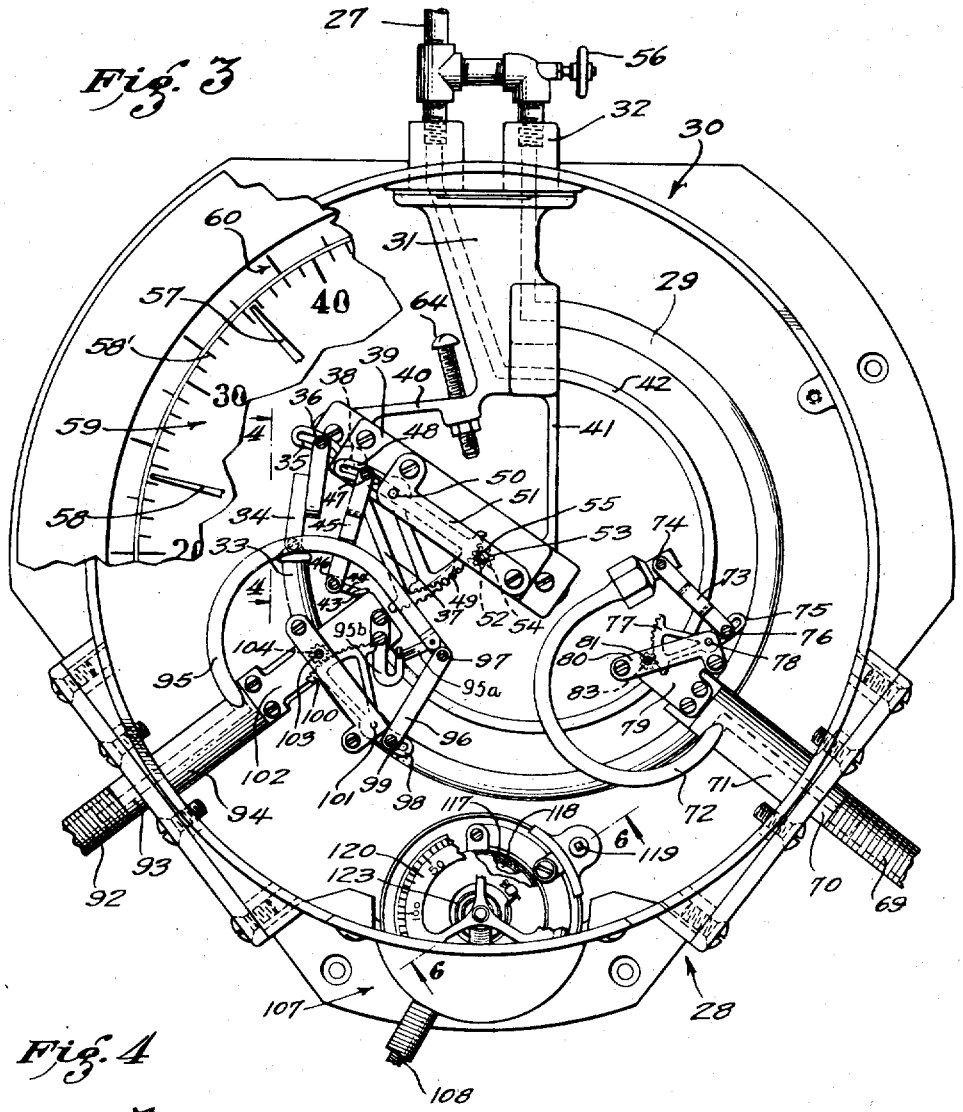
Fig. 3 is a view in elevation showing the indicator with its face removed to disclose the vital parts thereof.
Figure 4:
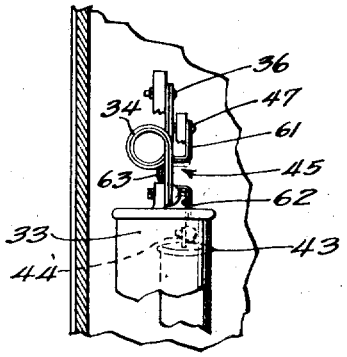
Fig. 4 is a fragmentary view in elevation as seen on the line 4—4 of Fig. 3 and which shows temperature compensating means for the fluid pressure gauges of the apparatus.
Figure 5:
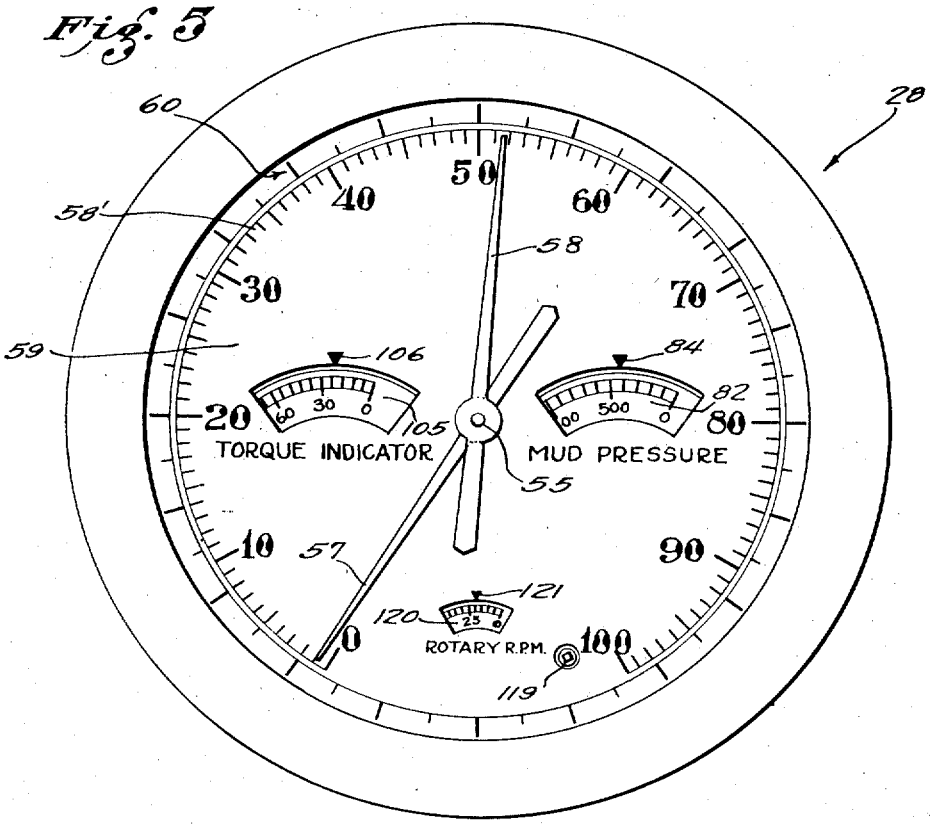
Fig. 5 is an enlarged view in elevation showing the face of the composite indicator.
Figure 6:
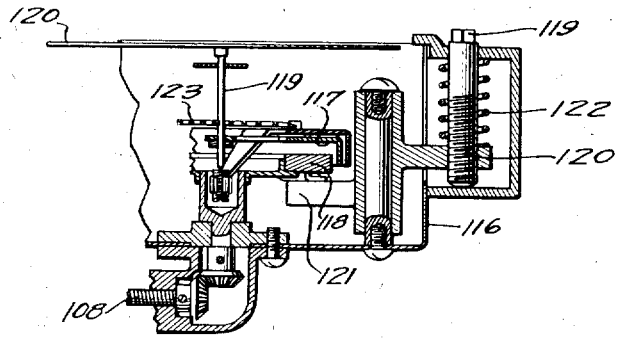
Fig. 6 is a fragmentary view in section and elevation showing the device for adjusting the revolution counter to compensate for changes in gear ratios of the draw works.

Referring more particularly to the drawings, 10 indicates a well shaft being drilled by a drill bit 11 suspended at the lower end of a drill string 12. The drill string 12 extends upwardly through a rotary table 13 and is driven by suitable driving means, such as the invention generally indicates at 14. The upper end of the drill string is supported by a swivel 15 carried by drill cable 16. The drill cable is led over a crown block 17 at the top of a derrick 18, one end of which cable is secured to the draw works 19, and the other end of which is secured to the calf wheel 20. A weight indicator 21 is here shown as being mounted upon the end of the cable 16 which is led around the calf wheel 20. This weight indicator is preferably of the general type known as the Martin-Decker weight indicator as disclosed in Patent Number 1,872,087, issued to Walter R. Martin under date of August 16, 1932, and entitled Tension indicator. This weight indicator is characterized by the fact that the cable 16 is led over a pressure post 22 and led under a pair of hooks 23 and 24 whereby a deflection of the cable will occur between the members 23 and 24 and over the post 22. The post bears against a flexible diaphragm 25 mounted within the housing 26 and forming one wall of a fluid compartment from which a suitable incompressible fluid may be forced through a conduit 27. The conduit 27 as here shown leads to a gauge structure 28 where it communicates with a Bourdon tube 29 within the case 30 of the gauge. The Bourdon tube is mounted at one end within a fitting 31 having a connection 32 for the tube 27. This tube is fitted at its free end 33 with a temperature compensating member 34, which in turn connects with a slotted operating arm 35 by a set screw 36. The slotted arm is formed as part of a gear quadrant 37 which is pivoted at 38 upon a plate 39. The plate 39 is mounted upon bracket arms 40 and 41 formed as part of the fitting 31. The Bourdon tube 29 is a vernier tube. In connection with the fitting 31 there is also provided a Bourdon tube 42 having a passageway of cross sectional area considerably less than that of the tube 29. This Bourdon tube is for a service indicating mechanism and at its free end 43 it is provided with a fitting 44 to which a temperature compensating link 45 is pivotally attached by a screw 46. The opposite end of the link is provided with a set screw 47 engaging a slotted arm 48 which is formed integral with a vernier gear quadrant 49 mounted upon a pivot pin 50 carried by the plate 39 and a bearing plate 51. Attention is directed to the fact that the vernier indicator quadrant gear 37 and the service weight indicator quadrant 49 are pivotally mounted upon separate pivots, the last named quadrant having a radius shorter than the quadrant 37. The gear segments, however, of the quadrants act upon members rotating around a common axis. The quadrant 37 engages a gear pinion 52 mounted upon a sleeve 53, and the quadrant 49 engages the gear pinion 54 mounted upon a pin 55 extending longitudinally within the sleeve 53. The vernier Bourdon tube 29 is supplied with pressure fluid from the conduit 27 and is controlled by a valve 56 which is momentarily opened when making a desired reading. The sleeve 53 rotated by the gear quadrant 37 actuates the vernier weight indicator hand 57, and the pin 55 which is rotated by the quadrant 49 actuates the service weight indicator hand 58. The vernier hand magnifies the regular weight indicator readings of magnitude which it is too small to ascertain from observation of the pointer hand 58. This result is obtainable due to the fact that between each of the 100 graduations of the weight indicating graduations 58' on the dial 59, there is, for example, in one type of device a distance of $\frac{9}{32}$ of an inch between each graduation, while with the vernier gauge calibrations indicated at 60 on the dial, the distance between two divisions is $1\frac{11}{16}$ inches. Both divisions equal one indicator point. In this same ratio, the vernier hand 57 makes one complete revolution of the dial while the weight indicator moves but $\frac{1}{6}$ of a revolution of the dial. The vernier is designed to make three complete revolutions, or 60 points on the dial, which is in fact six times as sensitive as the standard gauge. The vernier scale 60 is graduated as here shown in 40 divisions, each representing $\frac{1}{2}$ indicator point on scale 58' or $\frac{1}{2}$ pound pressure. The vernier thus makes it possible to accurately read relatively small weights which it is desirable to ascertain when side tracking, whip-stocking out, and straightening up crooked holes, directional drilling, milling, tapping, handling tubing on production wells, etc.

It has been found in practice that changes in atmospheric temperature conditions may materially affect the accuracy of indicating readings of indicating hands 57 and 58, and as previously mentioned, temperature compensating links 34 and 45 have been provided. The compensating link 34 is here shown as formed of a flat strip of metal having one convolution twisted into it at a point in its length so that expansion and contraction may properly take place.

The compensating link 45 comprises a pair of plates 61 and 62, lying flat, one upon the other, and both being formed with a loop 63 at a point intermittent the ends. These plates are made of metal having different thermal coefficients so that the distance between the points of connection of the plates on the Bourdon tube 42 and the arm 48 will be maintained substantially the same irrespective of temperature conditions. A set screw 64 is mounted on the bracket arm 40 of the fitting 31 to limit the movement of the gear quadrant 37.

It is now considered essential by drillers to maintain the pressure of the circulating mud in a direct relation to the drilling speed in order to prolong the life of the drill bit and to drill a straight hole, and such information is made available to the driller in the present instance by connecting a pulsation damper 65 to a pipe 66 leading from the slush pump 67. The pulsation damper is of the general type shown in my co-pending application entitled Method and means of weighing fluid pressures, bearing Serial No. 510,642, and filed January 23, 1931, which issued as Patent 2,037,425 on April 14, 1936. This device embodies the use of a diaphragm responsive to the pulsation and pressures of the circulating fluid being delivered to the drill stem through the swivel block 15 and through the grief stem 68. Connected with the pulsation damper is a tube 69 which leads to connection 70 of the gauge 28. This connection is provided with a fitting 71 through which the pressure fluid may flow to a Bourdon tube 72 at the end of which is a temperature compensating link 73 similar to the link 45 previously described. This link is pivoted to the end of the Bourdon tube by a screw 74 and to a slotted arm 75 by a screw 76. The slotted arm is a part of a gear segment 77 mounted upon a pin 78 mounted on plate 79 in turn mounted on the fitting 71. A bearing plate 80 supports the outer end of the pin 78 and also provides support for a pin 81 at the outer end of which a graduated indicating disc 82 is mounted and with which it rotates. A gear pinion 83 is mounted on the inner end of the pin and is in mesh with the gear segment 77. An index pointer 84 on the face of dial 59 serves to indicate the magnitude of the mud pressure in circulation.

Present drilling practice also recognizes that driving torque of the drill stem must be considered in efficient drilling operations, since this will indicate to the driller when the bit is dull, balled up, or out of gauge, and also when changes in earth formation are encountered or when a crooked hole is being drilled incident to which additional friction will be built up. Such conditions are reflected directly upon the power plant supplying drive force to the rotary table 13, and it has been found that these variations are directly reflected in variation in pressure of the steam in the manifold 85 of the engine. As a result, the manifold 85 of the drilling engine 14 is fitted with a diaphragm unit 86 which comprises a complementary pair of housing sections 87 and 88 between which a flexible diaphragm 89 is disposed. A fitting 90 communicates with the steam manifold 85 and is provided with a conduit 91 in communication with the lower housing member 88. Fluid pressure is imposed upon the diaphragm 89 which imparts a pressure to fluid within the housing section 87 and within a tube 92 leading to the gauge structure 28 and communicating with a connection 93. The connection 93 is in communication with a fitting 94 through which the pressure fluid is delivered to a Bourdon tube 95. This tube is fitted at its free end with a link 96 preferably of bimetal construction and fastened to the free end of the tube 95 by a pin 97 and at its opposite end to a slotted lever 98 by a set screw 99. The lever 98 is a part of a gear segment 100 pivoted upon a pin 101 carried by a bracket 102. The movement of the free end of the Bourdon tube 95 is limited by a link 95a pivoted at one end to the Bourdon tube 95 and having a slot and pin connection at its other end to a hook-shaped piece 95b fixed to and projecting from the bracket 102. The bracket 102 rotatably supports a shaft 103 carrying a pinion 104 in mesh with the gear segment 100. A graduated disc 105 is mounted upon this shaft and is observable through a window in the face of the gauge where its graduations may be registered with an index pointer 106. By this means the relative degree of resistance to torque of the driving drum is ascertainable at all times.

A tachometer is also provided as a part of the gauge structure with which the present invention is concerned. This may be used in connection with the draw works or may if desired be used with the rotary table, providing that a suitable transmission means connects the table with the pulley 115. This is now known to be a valuable addition to devices which contribute to the advancement of efficient oil well drilling, since it informs the driller of the relationship of the driving speed of the table to desirable progress of the drill bit in penetrating the formation. It has been found that high constant driving speed of the bit governed by accurate weight control and steam pressure assures that clean straight holes will be cut in some formations, while in other formations it is necessary to drive the bit at a slower speed of rotation in order to produce satisfactory results. In either case the result obtained by controlled driving speed and controlled feed having direct relation to the formation being drilled produces the most efficient cutting speed with the least amount of wear and strain upon the drilling equipment, and for that reason a tachometer is now deemed to be necessary for efficient drilling operations. The tachometer is here generally indicated at 107. It is fitted with a flexible drive cable 108 leading to a pulley 109, which pulley is supported in a forked bracket 110 mounted upon a stem 111. This stem extends through a supporting arm 112 suitably mounted upon the framework of the drill rig and is fitted at its lower end with an expansion spring 113 by which the stem may yieldably move through the supporting member 112. A belt 114 passes around the pulley and also around a pulley 115 mounted upon a shaft of the draw works or when it is desired to use the tachometer with the rotary table the pulley 115 is operatively connected therewith in any suitable manner. The tachometer is provided with an outer housing 116 within which is mounted a drag magnet 117. Disposed in parallel relationship to said drag magnet is a revolving magnet 118 which may move toward and away from the drag magnet which is mounted upon a shaft 119. A screw 120 is fitted with a yoke 121 by which the drag magnet may be moved. This screw is actuated by a key and is maintained under tension by a spring 122. When the revolving magnet is moved due to driving action of the member 108 the magnetic drag existing between the two members will increase and decrease in direct relation to their position with relation to each other, as determined by the adjusting screw 120 and the yoke 121. A hair spring 123 restores the indicating member to its zero position when the tachometer is not in operation.

It will, of course, be understood that the various elements of the present invention may be easily attached to recording mechanism whereby a permanent record of the performance of each of the gauges may be constantly made on a time chart so that the drilling operation on each tour may be apparent to those in charge and so that the condition of the formation through which drilling operations are made may be readily ascertained.

In considering the operation of the present invention it is to be pointed out that the gauge is provided to furnish the driller with necessary factors of information by which drilling operations may be efficiently maintained and a straight hole drilled. The various gauge elements are assembled at the desired points of application in order to obtain the impulses and forces which furnish the index for drilling operations. The rotary table may then be set in motion through the medium of the drilling engine 14 by which the table 13 is driven. The speed of feed of the drill bit is controlled by the draw works 19. The speed of rotation of the drum is ascertained by the readings of the tachometer 107. At the same time the mud pump 67 is placed into operation to create a circulating pressure for the drilling fluid. This pressure is ascertained from the structure 65 applied to the pipe 66 in communication with the mud pumps. The drilling weight is ascertained from the weight indicator 21 which is applied to the dead end of cable 16. With these members in their operative relation, variation in resistance to torque of the rotary table as occasioned by variation in the earth formation penetrated by the drill will be directly reflected in variation in pressure of the steam within the steam manifold 85 of the drilling engine 14. This will effect the diaphragm unit 86 and produce a variation in fluid pressure within the tube 92 leading to Bourdon tube 95, and will then rotate the indicator disc 105 with relation to the index pointer 106 to show any variation in resistance to torque as occasioned in any manner within the well. The speed of drill feed will be ascertained due to the rotation of pulley 109 by the belt 114, this rotation being imparted through the flexible driving cable 108 to the rotating magnet element 118 of the tachometer 107. The tachometer may be adjusted when first applied to the machine by adjusting its movable fields 118 until the graduated disc 120 thereon is set to a predetermined graduation which would be the common setting point of the instrument irrespective of the gear ratio of the gears in the draw works. Variation in drilling speed will thereafter be directly readable by relative movement of disc 120 with relation to the index pointer 121 on the face of the gauge. The variation in mud pressure is indicated through the pulsation damper 65 by which a pressure fluid moving in tube 69 is given impulses. The tube 69 is connected with a Bourdon tube 72 and appropriately rotates the graduated disc 82 with relation to the index pointer 84 on the face of the gauge. The proportion of weight of the drill string resting on the bottom of the hole being made, as well as other conditions within the hole is constantly reflected by the indicating hand 58 of the weight indicator. This hand is actuated by the Bourdon tube 42 communicating through the conduit 27 with the weight indicator 21. When it is desired to obtain more accurate readings than those which could be ascertained by movement of the pointer 58 with relation to the dial 59; valve 56 may be opened to allow the pressure fluid from the weight indicator 21 to pass into the Bourdon tube 29 and move the indicator hand 57 with relation to the series of graduations on the dial 60 of the gauge. This will result in producing a vernier reading under conditions momentarily established, since it is not desirable to maintain a constant pressure on the vernier.

From the foregoing it will be seen that by the gauge structure here disclosed it is possible to accurately ascertain all of the desirable features required in the drilling operation, and to be instantly advised as to any material change in conditions which would produce variation in these factors. It will also be evident that with all of the data at hand as constantly and visually disclosed to the driller by the gauge 28 it is possible to properly adjust the various elements of the drill rig so that the performance of the drill rig will be in direct and appropriate relationship to the conditions encountered in drilling a particular formation and such other conditions as might arise incident thereto.

It will be understood that while reference is made in the foregoing application to the use of this device in drilling straight holes, that the gauge apparatus is suitable for use in any desired procedure of drilling, whether it be straight hole, directional or controlled drilling.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:

1. A fluid pressure indicator comprising a fitting, a Bourdon tube connected at one end thereof, indicating means actuated by the free end of said tube, a second Bourdon tube of relatively large cross section in communication with said fitting, indicating means connected with the free end thereof, said second means acting over a range of movement greater than that of the first tube and independently thereof, means for continuously supplying fluid under pressure to the first of said Bourdon tubes, means for separately delivering said fluid under the same pressure and from the same source to the second of said Bourdon tubes, and an optionally controlled valve for establishing and interrupting the flow of pressure fluid to the second of said Bourdon tubes.

2. A fluid pressure gauge comprising a dial having two sets of graduations thereon, an operable indicating hand adapted to move normally over the face thereof to indicate the pressure of a fluid upon one of said sets of graduations, and a second hand providing the vernier reading of said pressure upon the other of said sets of graduations, a Bourdon tube for the first indicating hand, operative means responsive thereto for moving said hand, a Bourdon tube of relatively large cross section for the vernier hand, operative means connected therewith independently of the first named tube and responsive thereto for moving said vernier hand, and means delivering fluid from a common source and under the same pressure to both of said Bourdon tubes.

3. A pressure gauge comprising a dial having circularly arranged set of coarse graduations and a concentric set of fine graduations, an inlet fitting having two separate conduits therethrough, means for connecting said conduits with a common source of supply, a manually controlled valve for interrupting the flow of fluid to one of said conduits, a Bourdon tube of relatively small cross-sectional area in communication with the conduit in the fitting which is under uninterrupted pressure, an indicating hand adapted to operate in conjunction with the fine set of graduations, operating means between the indicating hand and said Bourdon tube to move the hand in proportion to the pressure therein, a second Bourdon tube of relatively large cross-sectional area and in communication with the conduit through which interrupted pressure may exist, a vernier indicating hand for said tube adapted to move in conjunction with the dial having coarse graduations, an operating means connecting said vernier indicating hand with the second named Bourdon tube, said second operating means moving said vernier indicating hand over a relatively great length of graduations on the dial and in direct proportion to the movement of the first named hand whereby when the fluid control valve is momentarily open the two hands will combine to give a vernier reading.

4. A fluid pressure gauge comprising a dial having two sets of graduations thereon, an operating indicating hand adapted to move normally over the face of the dial to indicate the pressure of a fluid upon one of said sets of graduations, a second hand providing a vernier reading of said pressure upon the other of said sets of graduations, a Bourdon tube for the first indicating hand, operative means responsive thereto for moving said hand, a Bourdon tube of relatively large cross section for the vernier hand, operative means connected therewith independently of the first named tube and responsive to the tube of relatively large cross section for moving said second hand, means for delivering fluid from a common source and at the same pressure to both of said Bourdon tubes, and optionally controlled means for momentarily establishing and interrupting the supply of said pressure fluid to the vernier Bourdon tube.

5. A fluid pressure gauge comprising a dial having two sets of graduations imposed a thereon, an indicating hand adapted to move over the face of said dial to indicate the pressure of a fluid upon one of said sets of graduations, a second hand providing a vernier reading of said pressure upon the other of said sets of graduations, a primary Bourdon tube, means responsive to said primary Bourdon tube for moving said indicating hand, a secondary Bourdon tube, means connected to said secondary tube independently of said primary tube and responsive to said secondary tube for moving said vernier hand, means for delivering fluid from a common source at equal pressure to said primary and said secondary tubes, and optionally controlled means for momentarily establishing and interrupting the supply of said pressure fluid to said secondary Bourdon tube.

WALTER R. MARTIN.